United States Patent [19]

Sedlacek

[11] Patent Number: 4,480,587

[45] Date of Patent: Nov. 6, 1984

[54] ANIMAL CAGE ASSEMBLY WITH REUSABLE FILTER CAP

[75] Inventor: Robert S. Sedlacek, Stoneham, Mass.

[73] Assignee: Lab Products, Inc., Maywood, N.J.

[21] Appl. No.: 422,355

[22] Filed: Sep. 23, 1982

[51] Int. Cl.³ .................................................. A01K 1/03
[52] U.S. Cl. .......................................... 119/15; 119/17
[58] Field of Search .................................... 119/15, 17

[56] References Cited

U.S. PATENT DOCUMENTS

| | | | |
|---|---|---|---|
| 3,304,913 | 2/1967 | Nesher | 119/15 |
| 3,343,520 | 9/1967 | Schwarz, Jr. | 119/15 |
| 3,877,420 | 4/1975 | Eagleson, Jr. | 119/17 X |
| 4,334,500 | 6/1982 | Ziller | 119/15 |

FOREIGN PATENT DOCUMENTS

| | | | |
|---|---|---|---|
| 36628 | 9/1981 | European Pat. Off. | 119/17 |
| 2065440 | 7/1981 | United Kingdom | 119/17 |

*Primary Examiner*—Robert P. Swiatek
*Attorney, Agent, or Firm*—Edward F. Levy

[57] ABSTRACT

A cage assembly for animals includes a cage having an open-top transparent body and a containment member for the cage body to confine the animals. A filter cap for biologically isolating the encaged animals from the environment surrounding the cage assembly is disposed on the cage. The filter cap has a substantially rigid transparent housing that rests on and encompasses the cage. A portion of the filter cap overhangs a portion of the cage to prevent the filter cap from being dislodged from the cage. An air filter is detachably secured to a roof portion of the filter cap and is protected from damage by a perforated metal plate. All elements of the filter cap are autoclavable and reusable.

9 Claims, 8 Drawing Figures

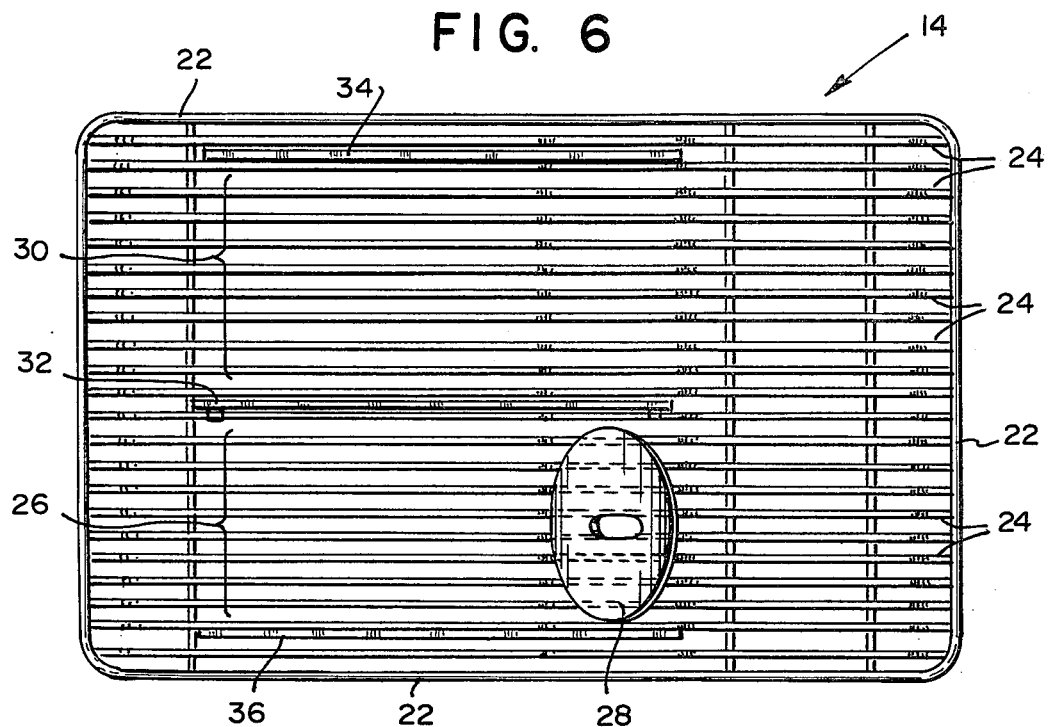
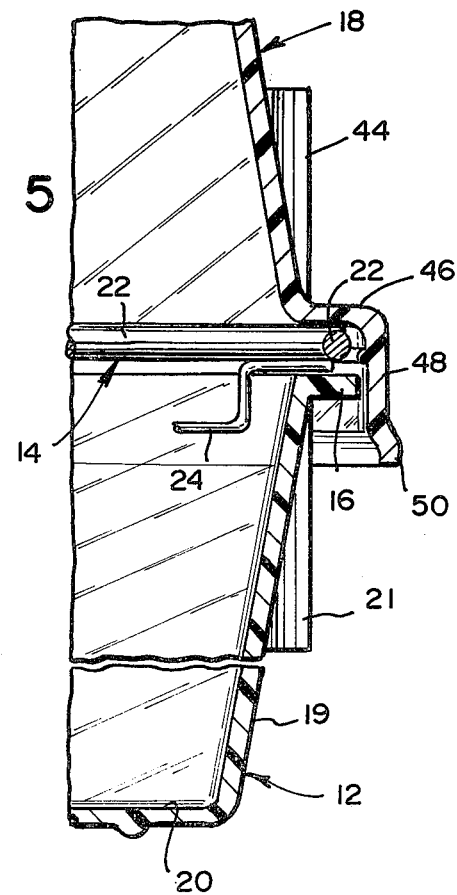
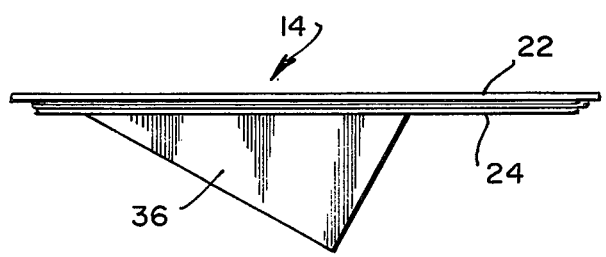

ANIMAL CAGE ASSEMBLY WITH REUSABLE FILTER CAP

BACKGROUND OF THE INVENTION

The present invention relates to caging systems for housing and isolating laboratory animals, and in particular to cage assemblies for the breeding of colonies of mice, rats or other small laboratory animals or for laboratory experimental work with such animals. Each of the cage assemblies includes a see-through cap or bonnet which has a detachable reusable filter, and remains securely in place on the cage body without being fastened thereto, to function as an effective microbiological barrier.

In the production of colonies of mice or other small laboratory animals by breeding, the mice are housed in animal cages which are arranged in close proximity within confined areas. The colonies are subject to airborne diseases which spread rapidly from one cage to another, particularly where the surrounding environment is not particularly sanitary. It is particularly desirable to maintain a closed, limited Defined Flora colony, that is a colony of mice having a limited number of bacteria which are constantly the same. It has hitherto been impossible to maintain a constant flora over long periods of time without employing complex isolator systems which are expensive and not economically feasible in the breeding production of laboratory mice.

The same problems are encountered in the maintainence of the animals during laboratory experimental work. Although the surrounding environment is more sanitary, the animals are housed in open cages which are arranged in close proximity to each other, usually on multi-tier racks. The animals in the different cages may be infected with various selected diseases while others may be uninfected for comparison purposes. It has been difficult or impossible to prevent the spread of diseases from one cage to another without employing complex isolator systems.

Conventional cages for small laboratory animals are usually of the open-mesh type in which the cage side and bottom walls are made of wire grill or perforated metal, or of the "shoebox" type having solid imperforate side and bottom walls made of transparent plastic material, and an open top. The cage assembly of the invention herein is directed to the latter type of "shoebox" transparent cage body, in combination with a filter cover therefor. The cage body may include a removable lid made of a grid of straight spaced bars, and shaped to contain hoppers for the storage of food and water which are easily accessible to the animals within the cage. The term "cage", as used in this description, generally refers to a cage body or tray having solid side and bottom walls and an open top, with the optional inclusion of a grid-type lid overlying the open top and having means for mounting water and food containers.

In the use of such cages for animal production or experimental laboratory research, it is imperative that bacteriological conditions established in an individual cage be maintained for as long as such conditions are desired. It is also desirable to have a clear view of the animals through any top cover provided for the cage, since other portions of the cage are occasionally obstructed.

Attempts to accomplish these objectives are well known in the art. For example, U.S. Pat. No. 3,343,520 discloses a disposable animal cage filter cover having a body formed of glass fibers and polyvinyl chloride. The filter cover is made from a blank that is cut into several panels, folded and assembled or made from a collapsible construction. Cut-outs are included in the filter cover for transparent window members. This structure is not autoclavable and its sterility at the time of use cannot be assured. Furthermore, the cover can be easily dislodged during use, thereby upsetting the microbiological conditions in the cage. In addition, the recurring expense associated with such a structure as well as the establishment of a safe disposal procedure for the covers after their use are further problems that must be dealt with.

U.S. Pat. Nos. 3,528,227, 3,528,390 and 3,613,639 show animal cage covers that are molded in one piece from a fibrous web material, such that the entire cover constitutes a filter. Although these covers can be reused, they are opaque, light-weight and tend to dislodge on the cage, especially when one cage is placed in close proximity to another where abutment of adjacent cage covers is likely.

It is thus desirable to provide a reusable filter cap or cover for an animal cage that has the microbiological integrity of a complex isolator without high cost or awkward limitations on the movement of people and animals. It is also desirable that such cap permit viewing of the encaged animals and be autoclavable.

It is an object of the present invention to provide an animal cage filter cap which is constructed to be removably mounted in secure position upon standard animal cages having solid transparent walls, and which provides with the cage an effective microbiological barrier for the animals housed therein, and minimizes the emission of animal odors from the cage by maintaining limited defined anaerobic bacterial flora.

Another object of the invention is the provision of an animal cage filter cap of the type described which is reusable and which mounts a removable and reusable filter, both the cap body and filter being capable of being autoclaved.

Another object of the invention is to provide an animal cage filter cap of the character described which is transparent so that the housed animals can be observed therethrough, and which is rigid, durable, easy to handle, easy to sterilize, uses minimal rack space, and does not dislodge when adjacently-disposed cages are pushed against one another during handling.

A further object of the invention is the provision of an animal cage filter cap of the character described which is incorporated in a novel cage assembly and caging system which is simple to use, inexpensive to produce, and allows easy access to selected cages without time consuming entry procedures.

SUMMARY OF THE INVENTION

In accordance with a preferred embodiment of the invention, the animal cage cap is in the shape of a box-like enclosure having a transparent body portion sized to fit upon the open top end of the animal cage in overlapping relationship with the cage wall. The cap body portion has a resting surface which is formed to engage a corresponding surface portion of the cage to effect a substantial seal like a petri dish between the cap and the cage. The cap body portion also includes a rigid flange which encompasses the cage such that the cap cannot be dislodged from the cage, but must be lifted off for removal. The cap body has an open top portion covered by an overlying autoclavable filter which is detachably secured to the cap body and is removable and reusable.

Additional objects and advantages of the invention will become apparent during the course of the following specification when taken in connection with the accompanying drawings, in which:

BRIEF DESCRIPTION OF THE DRAWINGS

FIG. 5 is a sectional view taken along the line 5—5 of FIG. 2;

FIG. 6 is a top plan view of the cage lid or containment member;

FIG. 7 is a side elevational view thereof; and

DESCRIPTION OF THE PREFERRED EMBODIMENTS

Figure 1:
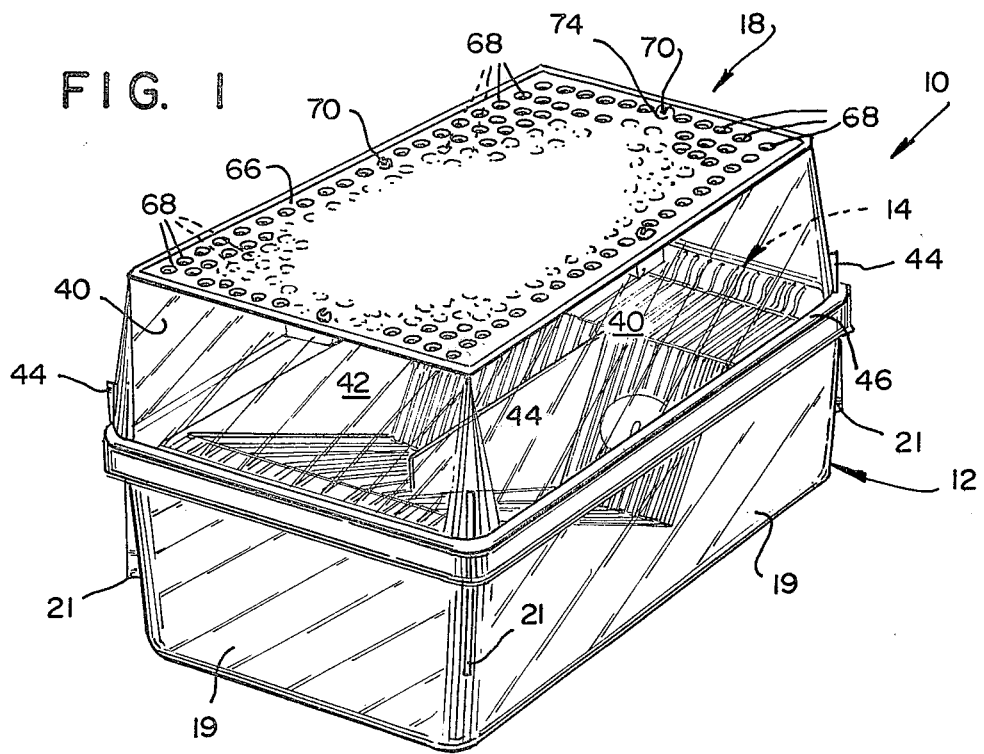
FIG. 1 is a perspective view of an animal cage assembly incorporating one embodiment of the present invention.

Referring in detail to the drawings, a cage assembly incorporating one embodiment of the invention is generally referred to by the reference number 10 in FIG. 1.

The cage assembly 10 comprises a box-like animal cage 12 with a cage lid or containment member 14 supported on a peripheral lip 16 of the cage 12. The term "cage", as used herein, generally refers to the combination of the cage bottom 12 and the cage containment member 14, although incorporation of the latter in the assembly 10 is optional. The cage assembly 10 also includes a filter cap 18 which covers the cage 12 and the cage containment member 14.

Figure 2:
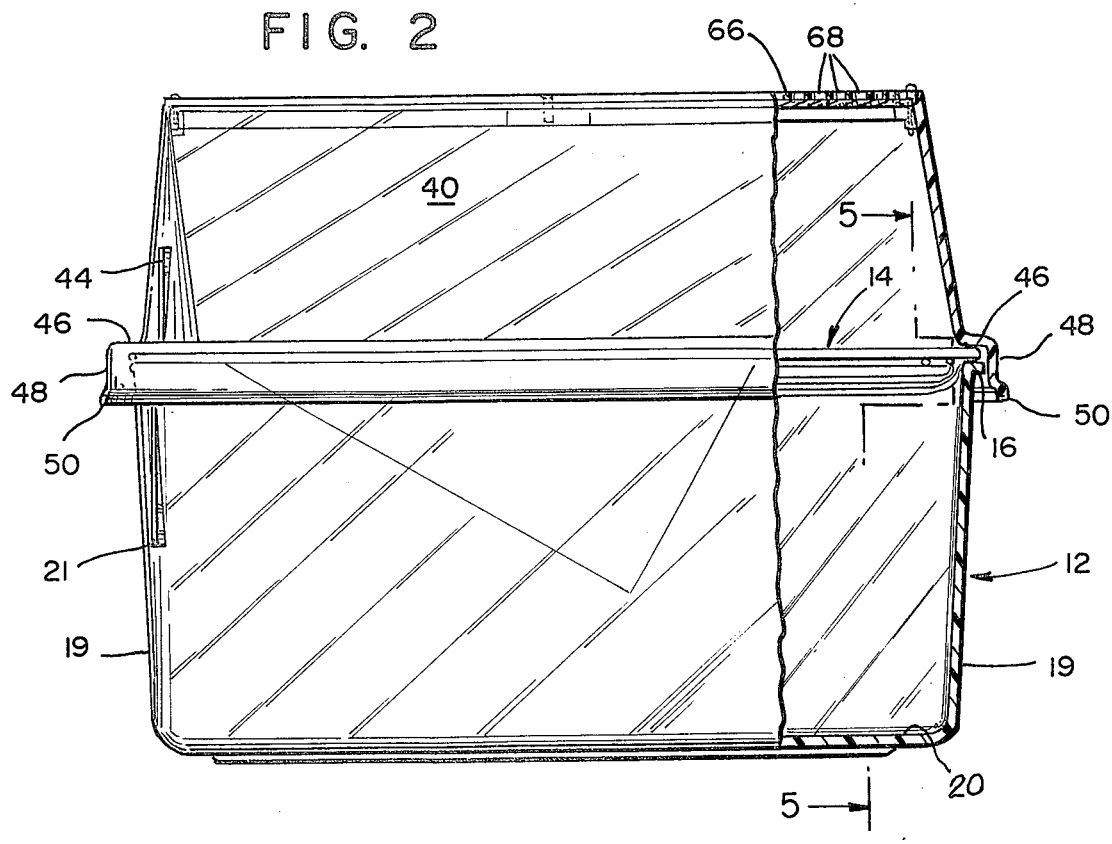
FIG. 2 is a side view of the animal cage assembly of FIG. 1, with a portion thereof broken away and shown in section.

The cage 12 is formed with integral side walls 19 and a bottom wall or floor 20 and an open top end. The walls are preferably formed of a clear transparent plastic such as polycarbonate, which is rigid, durable, permits ready inspection of animals, has a high impact strength, and is machine washable or autoclavable at temperatures under 250° F. Such cage is conventional, commercially available, and widely used. A standard absorbent bedding of particulate material such as wood chips (not shown) may be spread on the floor 20 (FIG. 2) of the cage 12. The open top of the cage 12 is bordered by the lip 16 which extends continuously therearound. The cage 12 also includes corner reinforcements 21 as most clearly shown in FIGS. 1 and 5.

The cage lid or containment member 14 shown in FIGS. 6 and 7 is disclosed in U.S. Pat. No. 3,358,649 which is essentially a bar construction formed of stainless steel for example. The member 14 comprises an outer rim 22 which is disposed on the lip 16 of the cage 12. A plurality of bars 24 extend across the rim 22. The cage lid or containment member 14 is employed to mount containers for food and water in a position in which they are readily accessible to the animals within the cage. For this purpose, some of the bars 24 are depressed and bent angularly to form a water bottle compartment 26 with a bottle support 28 and a food compartment 30. The compartments 26 and 30 are divided by a swingable divider panel 32 and are bordered by end panels 34 and 36.

The filter cap 18 comprises a body portion 38 in the general shape of a deep tray or box. The body portion 38 is preferably formed of clear plastic such as polycarbonate having the properties previously described for the cage bottom 12. The body portion 38 includes respective opposed side walls 40, 40, and end walls 42, 42, with corner reinforcements 44 at the intersections of the side walls 40 and 42. Surface means on the body portion 38 for resting the filter cap 18 on the cage 12 include a continuous peripheral flange 46 extending perpendicularly outwardly from the walls 40 and 42. Means on the body portion 38 for encompassing the cage 12 include a continuous peripheral flange 48 depending from the peripheral flange 46 and having an outwardly-extending rim portion 50.

As most clearly shown in FIG. 5 the flange 48 is spaced from, encompasses and overhangs the lip 16 of the cage 12. Thus the filter cap body portion 38 cannot be dislodged from the cage 12 and must be lifted off to be removed. It should also be noted that the clearance space between the flange 48 and the lip 16 permits only a slight movement of the filter cap 18 on the cage 12. However, the peripheral flange 46 is of sufficient lateral extent to remain in contact with the cage lip 16 or with its overlying lid 14 despite any relative lateral movement between the filter cap 18 and the cage 12, to maintain the integrity of the seal between the filter cap and the cage.

Figure 3:
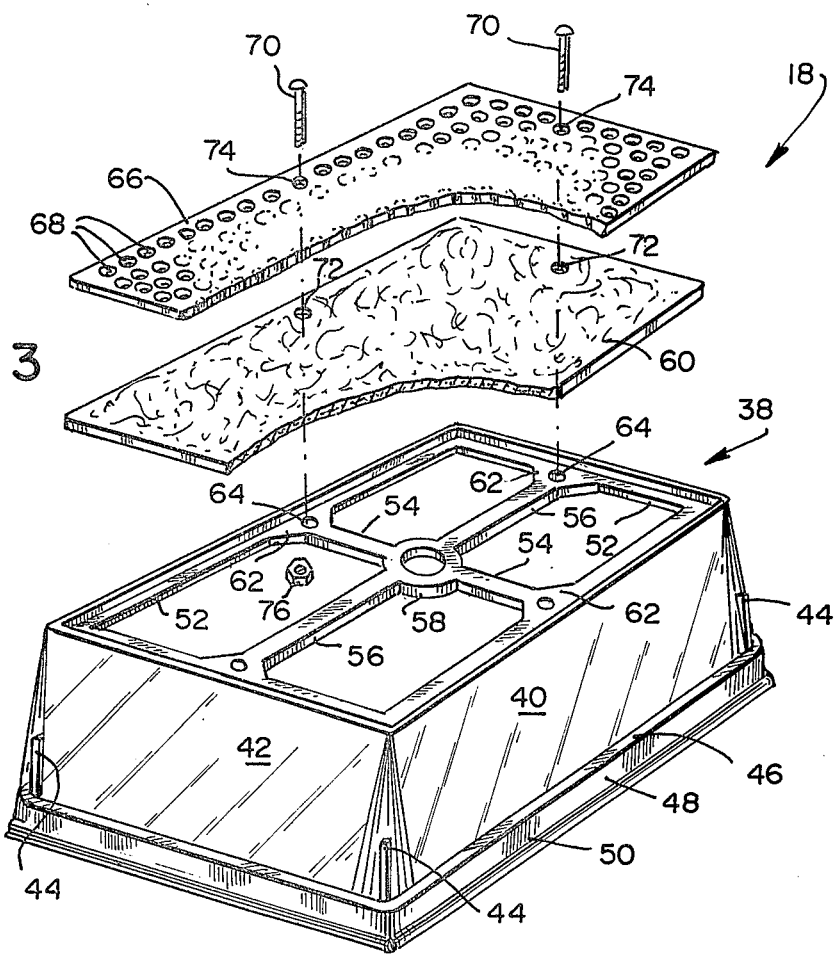
FIG. 3 is an exploded perspective view of the cap lid of the assembly of FIG. 1.
Figure 8:
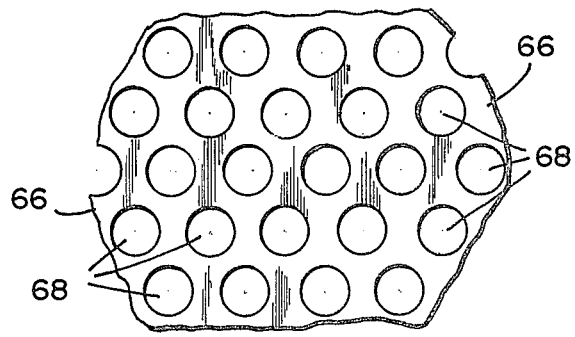
FIG. 8 is an enlarged fragmentary plan view of a protective member for the filter.
Figure 4:
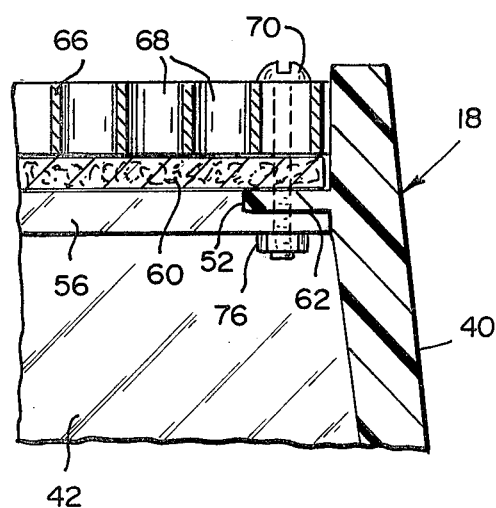
FIG. 4 is an enlarged fragmentary sectional view of the upper corner of the cage lid, as viewed in FIG. 2, showing the manner in which the filter is detachably secured to the cap housing.

The filter cap body portion 38 has a top open end bordered by a narrow ledge 52 which extends continuously around the cap body portion 38, as shown in FIGS. 3 and 4. Cross arms 54 and 56 are molded integrally with the ledge 52 and intersect with a central annular portion 58, as shown in FIG. 3. The ledge 52, cross arms 54 and 56, and annular portion 58 are co-planar, and are recessed a short distance below the top edges of the filter cap side and end walls 40, 42. Enlarged triangular portions 62 are provided at each intersection of the ledge 52 with the cross arms 54, 56. The enlarged portions 62 are provided with fastener openings 64.

The ledge 52, cross arms 54, 56 and central annular portion 58 are provided as means for detachably securing an air filter 60 in a position in which it overlies the top open end of the filter cap body portion 38, and for supporting said filter 60 immovably in mounted position.

The filter 60 is a thin sheet of spun-bonded polyester of the type sold by Du Pont under the Trademark REEMAY 20-24. A filter thickness of between 11 and 13 mils has been found adequate for a filter having an area approximately equivalent to the area of the cage floor 20.

The filter 60, in mounted position, extends across the opposite ledge portions 52 and is supported at its edges thereby, the central portion of the filter being supported by the cross arms 54 and 56 and the annular portion 58. A protective plate member 66, preferably formed of aluminum and provided with a plurality of perforations 68, is disposed over the filter 60 in flush abutment therewith. The plate member 66 may have a thickness of 1/16", with ⅛" perforations on 3/16" center lines. The filter 60 and plate member 66 are removably secured to each other and to the filter cap body portion 38 by a plurality of fasteners preferably in the form of threaded bolts 70 which pass through holes 72 in the filter 60 and aligned holes 74 in the plate member 66, the holes 72 and 74 registering with the fastener openings 64. The fastener bolts 70 are preferably formed of stainless steel and are engaged by respective nuts 76, also formed of stainless steel. During use of the filter cap 18, these fasteners provide means for disassembling and removing the filter 60 and plate member 66 for individual cleaning, sterilization, or replacement.

In the assembled filter cap 18, the perforated plate 66 overlies the filter 60 in flush abutment therewith, to protect the filter against damage during handling and prevent its buckling, while the filter 60 rests flush upon the ledge 52 and cross arms 54, 56 which support it in mounted position. The ledge 52 and cross arms 54, 56 are recessed at such a distance below the top edge of the filter cap body portion 38 that the upper surface of the mounted perforated plate 66 is on a plane substantially flush with said top edge or is slightly recessed therebeneath, as shown in FIG. 4.

In a commercial embodiment of the invention, the filter cap 18 is sized to fit upon a conventional transparent polycarbonate animal cage having a depth of approximately five inches, a top open end of approximately 11⅛ inches in length and 6⅞ inches in width. The body portion of filter cap 18 has a height of four inches, a top open end 10½ inches in length and 5¾ inches in width, and a bottom open end (between the inner surfaces of peripheral flange 48) of 11 13/16 inches length and 7½ inches width. The filter 60 measures ten inches in length and 5⅝ inches in width, and the plate 66 is of slightly smaller dimension. The assembled filter cap 18 weighs fourteen ounces.

In use of the cage assembly 10, the floor of the cage 12 is covered with bedding material (not shown) and one or more animals such as mice are placed thereon. The lid or containment member 14, if desired, is then positioned on the cage lip 16 and food and water are provided in the respective compartments 26 and 30. The filter cap 18 is then positioned on the cage 12 in the manner shown in FIGS. 1 and 2, and remains securely in place until lifted off. In the mounted position of the filter cap 18, its lateral peripheral flange 46 rests upon the outer rim 22 of the containment member 14, which in turn is resting upon the lip 16, as shown in FIG. 5, to provide with the overhanging flange 48 an effective air seal for the interior of the cage assembly. If the lid 14 is not included in the cage assembly, the flange 46 would rest directly upon the lips 16 to provide the same air seal. Because of its dimensions, and because of its relatively heavy weight, the filter cap 18 rests flush and firmly on top of cage 12 providing a seal around the edges, and cannot be easily dislodged. When it is necessary to remove the filter cap 18 for feeding or treatment of the animals, the filter cap may be simply placed on a towel soaked in disinfectant to maintain the cleanliness of the rim portion 50.

The caging assembly 10 is sized to facilitate manipulation of the filter cap 18 with one hand. The protective plate 66 permits rough handling of the filter cap 18 without causing damage to the filter 60, and the entire filter cap can be autoclaved as a unit for continual reuse. Since the flange 48 closely envelopes the open top of cage 12, there is minimal loss of rack space when cages are in close proximity to each other and the abutting of one filter cap 18 against another filter cap is unlikely to dislodge the filter caps from their respective cages.

Since the filter cap 18 overlaps and encloses the cage 12 and fits snugly thereon, a giant petri-dish like structure is obtained. The overlapping filter cap effectively keeps dust particles, which are the microbiological taxis, out of the cage assembly. Accordingly the assembly 10 is essentially a miniature isolator, a protected microenvironment within any macroenvironment. The filter 60 while functioning as an effective microbiological barrier, permits a substantial interchange of gases therethrough, so that the animals receive a substantial supply of fresh air. Thus, the disclosed caging assembly effectively isolates small laboratory animals from their outside environments which may include airborne contaminents such as viruses, bacteria or any particulate matter. The cage assembly also prevents cross-contamination between cages by aiding in infection confinement. Thus the caging system is also a first-rate quarantine housing system because animals from different sources with differing microbiological profiles can be quarantined in the same room without cross-contamination. The barrier works in both directions. It can keep contaminants in or out. Thus, the cage assembly disclosed herein has the microbiological integrity of a complex isolator.

It has been found that cage assemblies as disclosed herein permit the maintenance of a limited stable flora, allow freedom of movement of animals within a colony and with minimal emission of odors. It has also been found that the ammonia level within the colony is not a problem if the population density per cage is kept at 3 to 4 mice, and bedding changed every 3 to 4 days, especially when relative humidity cannot be controlled. Ammonia can be totally eliminated from the colony if defined flora mice without urease-positive aerobic bacteria are used. Also by using a small amount of bedding which is stirred by the animals, the cage can be kept reasonably dry between changes.

While a preferred embodiment of the invention has been shown and described herein, it is obvious that numerous additions, changes and omissions may be made in said embodiment without departing from the spirit and scope of the invention.

What is claimed is:

1. A filter cap for an open-top animal cage, comprising:
   a rigid body portion sized to fit upon and cover over the open top of said cage, said body portion having continuous, unbroken side and end walls, an open top end and an open bottom end,
   detachable air filter means extending across the entire open top end of said filter cap body portion,
   said air filter means comprising a sheet of filter material sized to fit closely within the open top end of said body portion, a rigid perforated protective plate overlying said sheet of filter material and of substantially the same size and shape as the latter, and a support structure including a plurality of cross arms underlying said sheet of filter material,
   means for detachably securing said filter means to said body portion in a mounted position in which said filter means covers over the open top end of said body portion with said sheet of filter material sandwiched between said rigid perforated plate and said support structure,
   flange means extending around the periphery of the open bottom end of said body portion and including a lateral flange portion sized and positioned to rest upon the top surface of said animal cage when the filter cap is inserted thereon, to effect a substantial peripheral seal between said filter cap and said cage, and a continuous rigid skirt portion depending from said lateral surface and sized to closely encompass the open top of said cage such that said filter cap overhangs said cage and cannot be dislodged therefrom.

2. A filter cap according to claim 1 in which said body portion is formed of a transparent plastic material.

3. A filter cap according to claim 1 in which said air filter means comprises a thin filter sheet of spun-bonded polyester which is autoclavable.

4. A filter cap according to claim 1 in which said support structure comprises a ledge extending around the inner surface of said body portion, and cross arms formed integrally with and extending between opposed portions of said ledge across the top open end of said body portion, said filter sheet resting upon said ledge and cross arms with said perforated protective plate resting flush upon said filter sheet.

5. A filter cap according to claim 4 in which said cross arms are formed with openings for receiving said securing means.

6. A filter cap according to claim 4 in which said ledge and cross arms are recessed below the top edge of said body portion at such a distance that the top surface of said protective plate is substantially flush with said top edge in the mounted position of said filter means.

7. A filter cap according to claim 4 in which said protective plate is made of metal and is formed with closely-spaced rows of perforations throughout its entire area.

8. A filter cap according to claim 1 in which said lateral flange portion extends continuously around the periphery of the bottom edge of said body portion to provide a substantially continuous contact between said lateral flange portion and said cage.

9. An animal cage assembly comprising cage means for confining animals within a predetermined space, and a filter cap for covering said cage means to biologically isolate said space from the environment surrounding said cage assembly, said cage means comprising an open-top body formed with an outwardly projecting peripheral lip, said filter cap comprising a deep, box-like housing portion having transparent side and end walls and an open bottom end, surface means extending laterally outward from the periphery of the open bottom end of said housing portion for resting said filter cap on said peripheral lip, rigid flange means on said housing portion extending substantially perpendicularly from said surface means and sized to encompass and extend a substantial distance below said peripheral lip such that said filter cap overhangs said lip and cannot be dislodged from said cage means, said surface means and flange means being of sufficient length to provide an air seal and a microbiological barrier for the interior of said cage means, detachable filter means mounted on said housing portion and means for detachably securing said filter means to said housing portion, said filter means comprising a sheet of filter material and a rigid perforated plate overlying said sheet.

* * * * *